Oct. 30, 1962 R. J. SCHANTZ 3,060,892
THERAPEUTIC BATH FOR ANIMALS
Filed Nov. 7, 1960
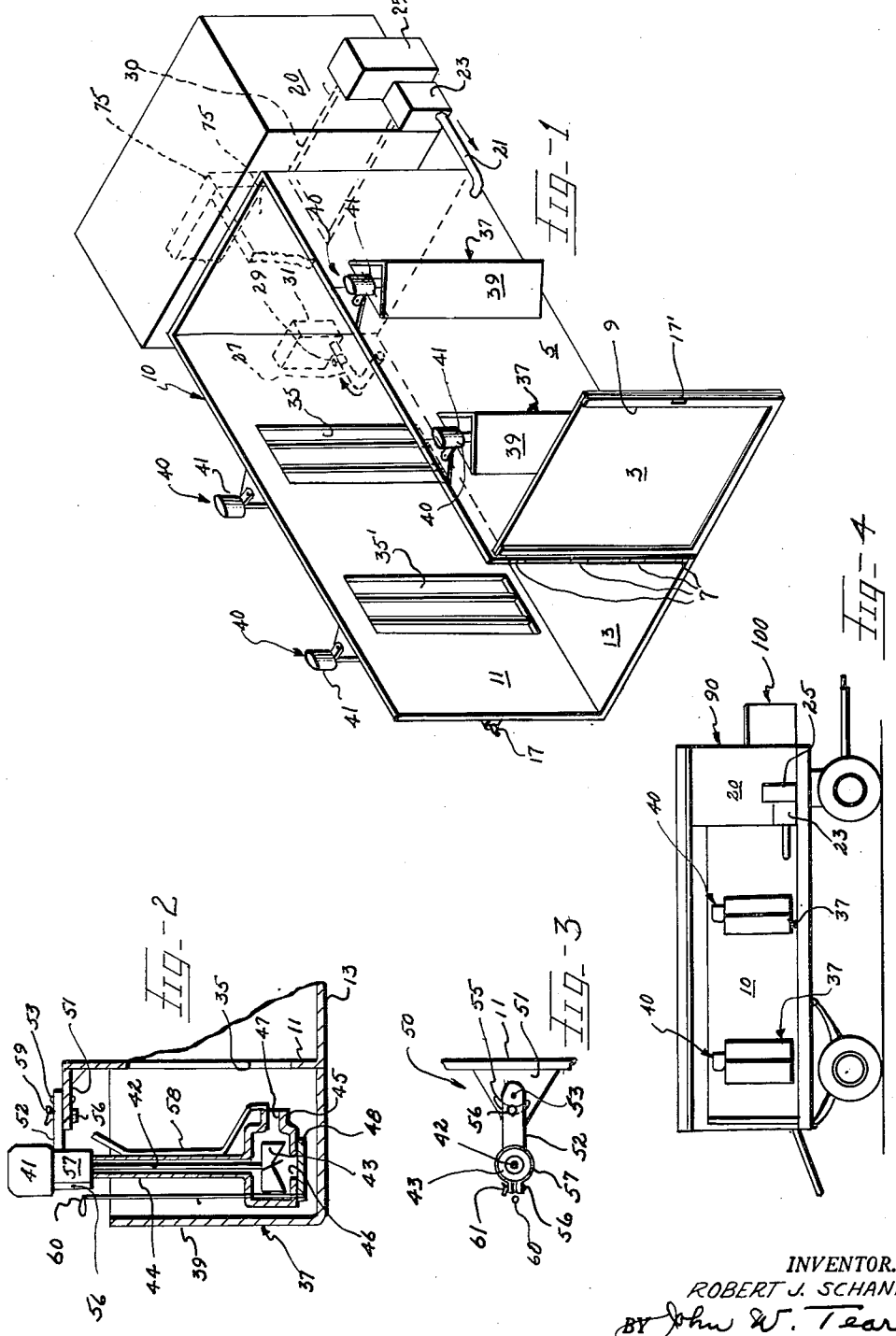
INVENTOR.
ROBERT J. SCHANTZ
BY John W. Teare United States Patent Office 3,060,892
Patented Oct. 30, 1962

3,060,892
THERAPEUTIC BATH FOR ANIMALS
Robert J. Schantz, 811 Ford Blvd., Hamilton, Ohio
Filed Nov. 7, 1960, Ser. No. 67,684
6 Claims. (Cl. 119—158)

This invention relates to therapeutic treatment for animals. More particularly, the invention relates to a therapeutic bath apparatus for race horses and the like. Preferably, though not necessarily, the bath may be incorporated as a mobile unit which may be conveniently towed or trucked to the area where needed for treatment of a sore or lame animal particularly of the quadruped species.

It is well known, for example, to treat humans for strained muscles, sore joints, infections or the like by means of a bath treatment wherein the strained, sore, or infected area is immersed in a warm water bath wherein the bath water is caused to circulate against the afflicted area.

Recently it has been discovered that this same treatment is highly effective in relieving distress in animals. In particular, the treatment is effective in reducing lameness, soreness, etc., in thoroughbred and standard bred race horses. These animals are particularly susceptible to such ailments which, because of the seasonal nature of racing, can drastically reduce the ability of the animal in this competitive sport.

Due to the fact that the location where races are held varies throughout the country and the racing season may be limited to relatively short stays in a given area, the benefits of therapeutic treatment are not always available when needed.

In addition, while the equipment for providing therapeutic bath treatment for humans may be comparatively simple, such is not the case with animals. Human patients exercise restraint, can control the bath temperature and position the part of the body requiring treatment in the most efficient position to take full advantage of the bath circulation. Animals cannot act, obviously in such fashion and thoroughbred animals are particularly a case in point tending to be high strung, reacting violently to any circumstance not familiar to them. Such action cannot only result in complete loss of benefit of any treatment, but may injure themselves and destroy the equipment designed to perform the necessary action to produce a curative result.

Therefore, it is an object of the invention to provide an apparatus for therapeutic treatment of animals.

A further object of the invention is to provide a therapeutic bath treatment for horses.

An additional object of the invention is to provide a therapeutic bath for animals wherein the apparatus is capable of performing the desired result without danger of destruction or danger of injury to the animal which may react violently to unfamiliar conditions.

Still a further object of the invention is to provide a therapeutic bath for quadrupeds which is compact, mobile, for easy movement from place to place, and which utilizes electrical energy to heat the bath fluid and as well energize the circulating devices utilized in the apparatus.

These and other objects of the invention not specifically mentioned, but inherent therein, may be accomplished by a bath receptacle of sufficient height and width to receive the animal within its interior, the sides of the receptacle having suitable apertures opening into an equal number of wells in communication with the interior of the receptacle for its entire height or depth, means disposed within each well for removing fluid from a strata adjacent the bottom of the receptacle and discharging a stream of fluid inwardly toward the interior of the receptacle, said means including an air inlet to cause air to be entrained within said stream in the form of minute bubbles, the fluid discharging means being adjustable relative to said aperture with which it is associated to cause the stream to impinge against the areas of the animal being treated, and means for heating and recirculating said bath fluid.

The receptacle may further be mounted on a mobile frame and preferably each stream discharging means is provided with a means for regulating the rate of discharge of each of said stream against the area being treated.

Having thus described the invention in general terms, a reference to the drawings attached to and forming a part of the following detailed description will enable a more complete understanding thereof readily apparent.

In the drawings, FIG. 1 is a perspective view of the apparatus illustrating the general arrangement of its components, FIG. 2 is an elevational view partially in section, illustrating a well and the fluid circulating means incorporated therein, taken along the line 2—2 of FIG. 1, and FIG. 3 is a plan view partially in section taken along the line 3—3 of FIG. 2, and FIG. 4 is an illustration of the invention, partially in schematic form showing the invention mounted on a mobile frame such as a trailer or truck bed or the like.

Referring now to FIG. 1, it will be seen that there is illustrated a tank 10 of sufficient length, depth or height or width to receive an animal to be treated, such as a race horse. One wall of the tank 10, preferably end wall 3 comprises a swingable gate pivotally connected to a side wall 5 by suitable hinges 7 such that it may be swung open to admit the animal into the interior of the tank 1. The edges of gate 3 are provided with a suitable gasket 9, in a known manner such that when gate 3 is swung to a closed position, a fluid tight seal is affected between the edges of sidewalls 5 and 11, and bottom 13 and the gate 3. Thus the tank 10, with gate or end wall 3 closed and locked by a suitable lock mechanism 17, 17[1] forms a fluid tight receptacle.

In communication with tank 10 via a filler conduit 21, a pump 23 and a filter unit 25, is a second tank 20 which may comprise a storage tank having sufficient capacity to fill the treatment tank 10 to the required depth with the treating fluid, usually water into which is dissolved a predetermined amount of Epsom salt or the like.

A second conduit 27 is also in communication with bath tanks 10 and 20 and is provided with a conventional manually operated regulator valve 29. This line defines a return conduit for the purpose as will be apparent subsequently. This return line may in some cases also be in communication with a pump 31 exhausting into tank 20.

Disposed interiorly of tank 20 is a heating device 30. This may be of a combustion type but preferably is an electric unit of conventional design. This unit 30 is of sufficient heat output to adequately warm the water in the tank to the desired treatment temperature. Such units are commercially available and need not be described in detail herein.

From the foregoing description it may be seen that heated fluid from tank 20 may be pumped into treatment tank 10 and, if desired, recirculated between tanks 10 and 20 via conduit 21, 27, pumps 23 and 31, and through a conventional filtration unit 25 of which there are a variety of commercial units available. In this fashion the bath may be continually heated to a desired temperature to effectively treat an incapacitated animal.

Turning now to FIGS. 1 and 2, detailed consideration will now be given to the means for directing a combination of treating fluid and air entrained bubbles to the afflicted areas being treated.

The sidewalls 5 and 11 of the tank are provided with at least two apertures 35, 35¹ of generally rectangular form extending from the top of treatment tank 10 to a point closely adjacent the bottom 13 thereof.

These apertures open into an equal number of identical blister or well structures 37 formed by outer housings 39 of generally half diamond or cylindrical form having their side and bottom edges fixed to the treatment tank by any one of several conventional means as where the tank 10 is metal and the housings 39 are welded thereto.

In the illustration of the invention embodied in FIG. 1, it will be apparent that four such housing structures are utilized to define four identical wells or blisters 37. Since each is identical, the following description of one such well will suffice for all.

Turning then to FIGS. 2 and 3, it will be seen that disposed within each well is a motor driven agitator unit 40 comprised of a motor 41, shaft 42, impeller 43 and housing 44. The motor 41, of course, drives shaft 42 and impeller 43 within housing 44. The entire unit is mounted on a pivot bracket assembly 50, comprised of two plates 51 and 52, plate 51 being fixed to agitator unit 40, plate 52 to the housing 37 connected by a pivot pin 53. Thus the agitator unit can be moved within the blister or well to swing about the pin 53. Preferably the plate 51 is provided with an arcuate slot 55 which receives a threaded bolt 56 passing through plate 52 such that a hand screw 59 may be tightened on bolt 56 to clamp plate 51 and hence agitator unit 40 at any desired position within the limits of arcuate movement permitted by slot 55. Generally an arc of 30°–45° is adequate for the purpose.

The plate 51 is connected to unit 40 by means of a split clamp 57 which surrounds housing 44 and which may be fastened or loosened around the housing by means of a threaded bolt 59 having a hand wheel 61 or an equivalent means fixed thereto. Thus aside from arcuate adjustment of unit 40, the entire unit may be raised and lowered in well 37 for the purpose as will hereinafter be apparent.

Returning now to a primary consideration of FIG. 2, it will be seen that housing 44 not only embraces shaft 42 but also it is provided with a bulbous lower end 45 which surrounds the impeller element 43. This bulbous portion 45 of the housing is provided with two apertures 46 and 47. The opening 46 is located at the bottom of this portion of the housing while the opening 47 is provided in the side of the housing and is directed inwardly toward the interior of treatment tank 10 through the aforementioned opening 35 acting as a discharge orifice because of its relatively small size and nozzle-like configuration. Thus the impeller 43 acts as a pump drawing the warm water which fills the well upwardly through opening 46 and discharging it at relatively high velocity through discharge orifice into the interior of the tank 10.

Since it is often desirable to regulate the discharge rate from the impeller 43, the inlet opening 46 in the bottom of housing portion 45 is provided with a cover plate 48 pivotally fixed to the housing by a bolt means 49 such that it may be moved to any position between a contiguous position over inlet 46 to a position completely out of the inlet. Thus by suitable adjustment this plate or cover member 48 via hand lever 60, it acts to meter the fluid passing through the bulbous portion 45 of housing 42 to regulate in turn the rate of discharge through discharge orifice 47.

As has been indicated each blister is similar to the one described above with the net result that there are four streams of warm fluid being directed inwardly toward the interior of treatment tank 10.

One other feature of some importance is also shown in FIG. 2. It will be noted that a small tube 58 is affixed to housing 42 having one end disposed adjacent to motor 41 and its lower end adjacent discharge orifice 47. This tube acts as an air entrainment medium to supply the water with entrapped bubbles which are carried into treatment tank 10.

In addition it may be desirable to place a flat plate or plank member 75 exteriorly around the upper marginal edges of the treatment tank 10 as indicated by the dotted lines of FIG. 1. This would serve to effectively raise the height of the tank, if necessary, and additionally these members would serve to protect the motors of units 40 from wetting.

From the above description it may be seen that, for example, a horse may be positioned standing in the tank. Gate 3 is then closed and sealed by means of latch 17. Pump 25 and heater 30 are energized to fill the tank with warm solution. When the level of the solution is high enough to cover the afflicted area, agitator units 40 are started and the areas are thus subjected to the continued action of warm moving water and entrained air bubbles. By adjusting the height of each of the units 40 in collar 57 and changing its angular position via brackets 51 and 52, the discharge orifice may be directed that the fluid flow is concentrated on the afflcted area of the animal, through apertures 35, 35¹. Also, if desired, the pumps 25 and 31 may be energized to keep warm water of the proper temperature flowing continually between storage and heating tank 20 and treatment tank 10.

FIG. 4 schematically illustrates the invention as carried on a mobile frame. Obviously this could be a truck or trailer, a trailer being illustrated. In this installation the entire unit is housed in a closed body 90 having a roof 92 with sufficient clearage to permit entry of a horse or other animal in the tank 10 via ramp 94.

It will be noted that all of the components, heater 30, pumps 25 and 31 and the agitator units 40 are electrically operated. Thus in the case of a mobile unit such as shown in FIG. 4, it may be desirable to also provide a self contained motor generator unit 100 to power these various elements for example in localities where electrical power is not available from conventional electrical outlets.

Having described my invention in detail, it will be apparent that various changes and modifications can be made which fall within the spirit and scope of the invention which is limited as defined hereinafter.

I claim:

1. A therapeutic bath for quadrapeds comprising a bath receptacle and a reservoir in communication with said receptace, means for controlling the passage of fluid to and from said reservoir to said bath receptacle, said bath receptacle including sides having spaced apertures therein approximating the location of the legs of an animal immersed in said bath, means defining a plurality of well structures disposed externally of said bath receptacle in communication with each of said apertures independent pump means and means disposed in each of said wells for removing fluid from a strata adjacent the bottom of said receptacle and discharging a stream of fluid interiorly of the receptacle at independently selected rates through each of said apertures and means for heating said fluid.

2. A therapeutic bath as defined in claim 1 wherein said fluid heating means is disposed within said reservoir.

3. A therapeutic bath device as defined in claim 1 wherein said independent pump means disposed within each of said wells included additional means for entraining air bubbles in the fluid stream directed interiorly of said receptacle.

4. An apparatus as defined in claim 1 wherein said fluid stream discharging means comprises an impeller, a housing surrounding said impeller and having an aperture opening toward the bottom of the receptacle and a nozzle opening toward the interior of said receptacle and motor means for driving said impeller and means for variably and selectively covering said apertures to control fluid flow from said nozzles.

5. An apparatus as defined in claim 4 wherein said housing motor means and impeller are adjustably mounted with each of said wells for both vertical and angular movement.

6. An apparatus as defined in claim 4 wherein all of said means are mounted on a mobile frame.

References Cited in the file of this patent

UNITED STATES PATENTS

| | | |
|---|---|---|
| 2,237,435 | Ille | Apr. 8, 1941 |
| 2,555,686 | Farrelly et al. | June 5, 1951 |
| 2,611,341 | Paris | Sept. 23, 1952 |
| 2,808,031 | Sollars et al. | Oct. 1, 1957 |